(12) United States Patent
Wang

(10) Patent No.: US 10,273,720 B2
(45) Date of Patent: Apr. 30, 2019

(54) DOOR BOLT STRUCTURE OF ELECTRONIC DEVICE

(71) Applicant: GETAC TECHNOLOGY CORPORATION, Hsinchu County (TW)

(72) Inventor: Chen-Ping Wang, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 448 days.

(21) Appl. No.: 15/093,586

(22) Filed: Apr. 7, 2016

(65) Prior Publication Data

US 2017/0292292 A1    Oct. 12, 2017

(51) Int. Cl.
| | | |
|---|---|---|
| E05B 65/00 | (2006.01) | |
| E05C 19/02 | (2006.01) | |
| G06F 1/16 | (2006.01) | |
| E05C 19/06 | (2006.01) | |
| E05B 15/16 | (2006.01) | |
| E05C 19/16 | (2006.01) | |
| E05B 17/00 | (2006.01) | |
| E05B 15/04 | (2006.01) | |

(52) U.S. Cl.
CPC .......... *E05B 65/0067* (2013.01); *E05C 19/02* (2013.01); *E05C 19/06* (2013.01); *G06F 1/1616* (2013.01); *G06F 1/1679* (2013.01); *E05B 17/002* (2013.01); *E05B 2015/0486* (2013.01); *E05B 2015/0496* (2013.01); *E05B 2015/1692* (2013.01); *E05C 19/163* (2013.01)

(58) Field of Classification Search
CPC ....... F24C 15/021; B65D 45/16; B65D 45/24; F16B 5/125; F16B 2/248; Y10T 24/308; Y10T 16/95; Y10T 24/1449; Y10T 24/1476; Y10T 24/149; Y10T 24/1494; Y10T 24/304; Y10T 24/45586; Y10T 292/48; F21V 31/00; E05B 2015/1692; E05B 65/0067; E05B 2015/0486
See application file for complete search history.

(56) References Cited

U.S. PATENT DOCUMENTS

| | | | | |
|---|---|---|---|---|
| 1,042,511 | A * | 10/1912 | Watrous | E05C 19/14 |
| | | | | 292/247 |
| 3,236,402 | A * | 2/1966 | Dellinger | B65D 25/32 |
| | | | | 215/286 |
| 3,265,884 | A * | 8/1966 | Kelley, Jr. | F21S 8/00 |
| | | | | 362/267 |
| 4,504,085 | A * | 3/1985 | Sachleben, Sr. | D01D 5/088 |
| | | | | 264/211.14 |

(Continued)

*Primary Examiner* — Mark A Williams

(57) ABSTRACT

A door bolt structure of an electronic device includes a door frame, a door panel, and a resilient metallic wire. The door panel is movably disposed at the door frame and provides a hermetic seal to the door frame. The two ends of the resilient metallic wire are connected to the door panel. The resilient metallic wire bends to form hook portions which protrude from the edge of the door panel. When the door panel provides a hermetic seal for the door frame, the hook portions are engaged with an inner edge of the door frame. When pulled, the resilient metallic wire drives the hook portions to separate from the door frame, thereby allowing the door panel to move relative to the door frame.

13 Claims, 7 Drawing Sheets

(56) References Cited

U.S. PATENT DOCUMENTS

| | | | | |
|---|---|---|---|---|
| 4,915,913 A * | 4/1990 | Williams | .................. | A61L 2/26 |
| | | | | 220/324 |
| 5,127,684 A * | 7/1992 | Klotz | ...................... | E05C 19/14 |
| | | | | 292/113 |
| 6,721,183 B1 * | 4/2004 | Chen | ....................... | G06F 1/181 |
| | | | | 16/404 |
| 7,325,846 B2 * | 2/2008 | Smith | ................... | E05C 19/006 |
| | | | | 292/137 |
| 8,274,755 B2 * | 9/2012 | Ishima | ................. | G11B 25/043 |
| | | | | 360/97.14 |
| 2013/0141637 A1 * | 6/2013 | Kaga | ........................ | E06B 7/22 |
| | | | | 348/373 |
| 2015/0022717 A1 * | 1/2015 | Coons | ..................... | E05C 19/14 |
| | | | | 348/373 |

* cited by examiner

DOOR BOLT STRUCTURE OF ELECTRONIC DEVICE

BACKGROUND OF THE INVENTION

Field of the Invention

The present invention relates to door bolt structures of electronic devices and, more particularly, to a structurally simple door bolt structure of an electronic device.

Description of the Prior Art

At least one connector is mounted on a conventional electronic device and adapted to input/output signals. When unconnected and thus exposed, the connector is predisposed to poor electrical contact because of exposure to dust or oxidation by moisture, for example. Therefore, a door panel is usually disposed on a casing of the electronic device to hide the connector. In general, the door panel gets locked and fastened with a door bolt structure as soon as the door panel is shut. Conventional door bolt structures each comprise a bolt and a spring connected to the bolt. Once the door panel is shut, the spring will restore the bolt to its initial position to thereby lock the bolt in the casing of the electronic device and thus fasten the door panel. Furthermore, the bolt can be pulled to release the door panel from the casing of the electronic device. However, not only does the door bolt structure require complicated components, but it is also difficult to manufacture and assemble.

In view of the aforesaid drawbacks of the prior art, the inventor of the present invention spared no efforts to conduct related research with reference to related theories with a view to overcoming the aforesaid drawbacks of the prior art.

SUMMARY OF THE INVENTION

The present invention provides a structurally simple door bolt structure of an electronic device The present invention provides a door bolt structure of an electronic device, comprising a door frame, a door panel, and a resilient metallic wire. The door panel is movably disposed at the door frame. The door panel provides a hermetic seal for the door frame. The two ends of the resilient metallic wire are engaged with the door panel. The resilient metallic wire bends to form a plurality of hook portions protruding from the edge of the door panel. When the door panel provides a hermetic seal for the door frame, the hook portions are engaged with the inner edge of the door frame. When pulled, the resilient metallic wire drives the hook portions to separate from the door frame, thereby allowing the door panel to move relative to the door frame.

Preferably, the resilient metallic wire bends and loops to form the hook portions. The resilient metallic wire bends and loops to form a handle. A handle is disposed on the resilient metallic wire and is a rod attached to the resilient metallic wire. The handle is disposed at the middle of the resilient metallic wire. The resilient metallic wire bends and loops to form a node. The resilient metallic wire rotates about the node pivotally. A ramp corresponding in position to each hook portion is disposed on the inner edge of the door frame. The hook portions are pressed against by the ramps, respectively, during the process of shutting the door panel relative to the door frame. The normal directions of the ramps meet each other. Limiting structures corresponding in position to the hook portions are disposed on the door panel, respectively. At least a portion of each hook portion is received in a corresponding one of the limiting structures such that the hook portions slide along the limiting structures, respectively. Engagement recesses are formed at the inner edge of the door frame and correspond in position to the hook portions to connect with the limiting structures, respectively. The hook portions are inserted into and engaged with the engagement recesses, respectively, when the door panel provides a hermetic seal for the door frame. A guiding slot is formed on the door panel, whereas the handle is penetratingly disposed in the guiding slot and slides along the guiding slot.

DETAILED DESCRIPTION OF THE EMBODIMENTS

Figure 1:
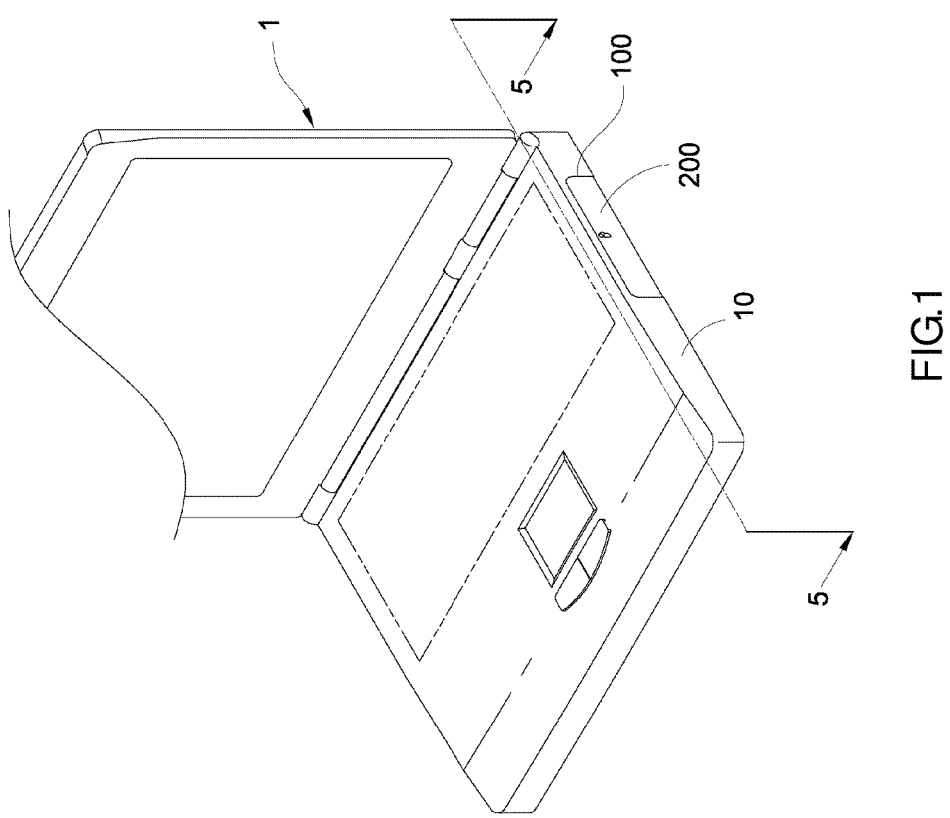
FIG. 1 is a schematic view of the configuration of door bolt structure of an electronic device according to the present invention.
Figure 2:
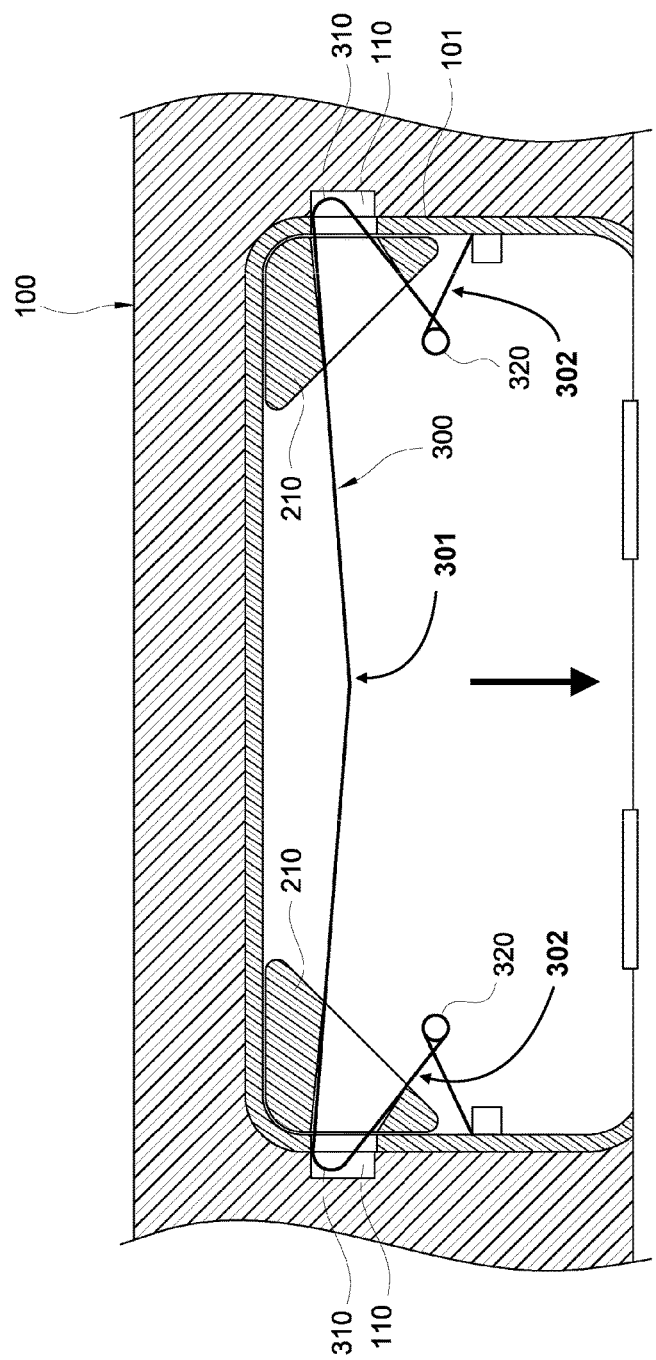
FIG. 2 is a schematic view of door bolt structure of an electronic device according to the first embodiment of the present invention.
Figure 3:
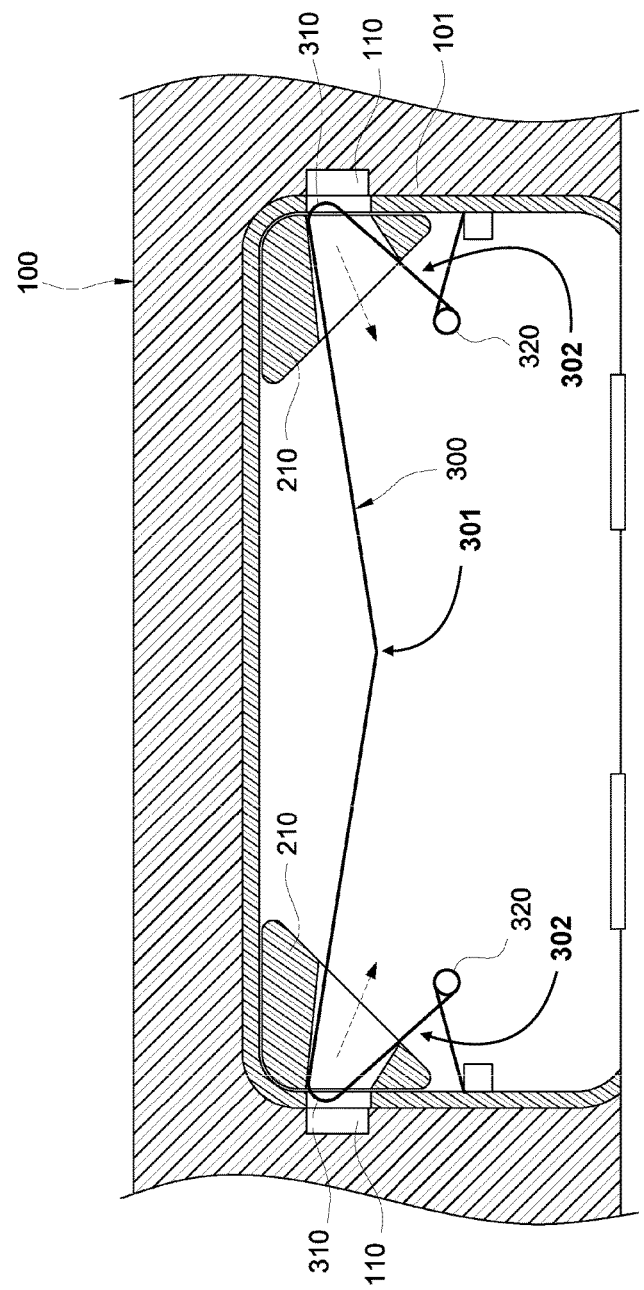
FIG. 3 is another schematic view of door bolt structure of an electronic device according to the first embodiment of the present invention.

Referring to FIG. 1 through FIG. 3, the first embodiment of the present invention provides a door bolt structure of an electronic device, comprising a door frame 100, a door panel 200, and a resilient metallic wire 300.

Preferably, the door frame 100 is formed on a casing 10 of an electronic device and has a through hole 101. The through hole 101 is in communication with the inside and outside of the casing 10 of the electronic device. A plurality of engagement recesses 110 is formed at the inner edge of the door frame 100. In this embodiment, preferably, a pair of engagement recesses 110 is formed at the inner edge of the door frame 100.

The door panel 200 is movably disposed at the door frame 100. The door panel 200 provides a hermetic seal for the door frame 100. In this embodiment, one side of the door panel 200 is preferably pivotally connected to a portion of the inner rim of the through hole 101 to provide a hermetic seal for the door frame 100 or expose the through hole 101. Therefore, the door panel 200 can be pivotally rotated to thereby hide the through hole 101 and provide a hermetic seal for the door frame 100. A plurality of limiting structures 210 is formed on a surface of the door panel 200. In this embodiment, a pair of limiting structures 210 is preferably formed on the inner surface of the door panel 200. The engagement recesses 110 correspond in position to and connect with the limiting structures 210, respectively.

The resilient metallic wire 300 bends and loops to form a plurality of hook portions 310. In this embodiment, the resilient metallic wire 300 preferably bends to form a pair of hook portions 310 corresponding in position to the engagement recesses 110 and limiting structures 210, respectively. The resilient metallic wire 300 is disposed on a surface of the door panel 200. In this embodiment, the resilient metallic wire 300 is preferably disposed on the inner surface of the door panel 200. The two ends of the resilient metallic wire 300 are connected to the inner surface of the door panel 200. The resilient metallic wire 300 is either fixedly connected to the door panel 200 or floatingly connected to the door panel 200, but the present invention is not limited thereto. At least a portion of each hook portion 310 is received in a corresponding one of the limiting structures 210. The hook portions 310 of the resilient metallic wire 300 protrude from the edge of the door panel 200 and slide along the limiting structures 210. The resilient metallic wire 300 bends and loops to form a node 320 and rotates about the node 320 pivotally.

Figure 4:
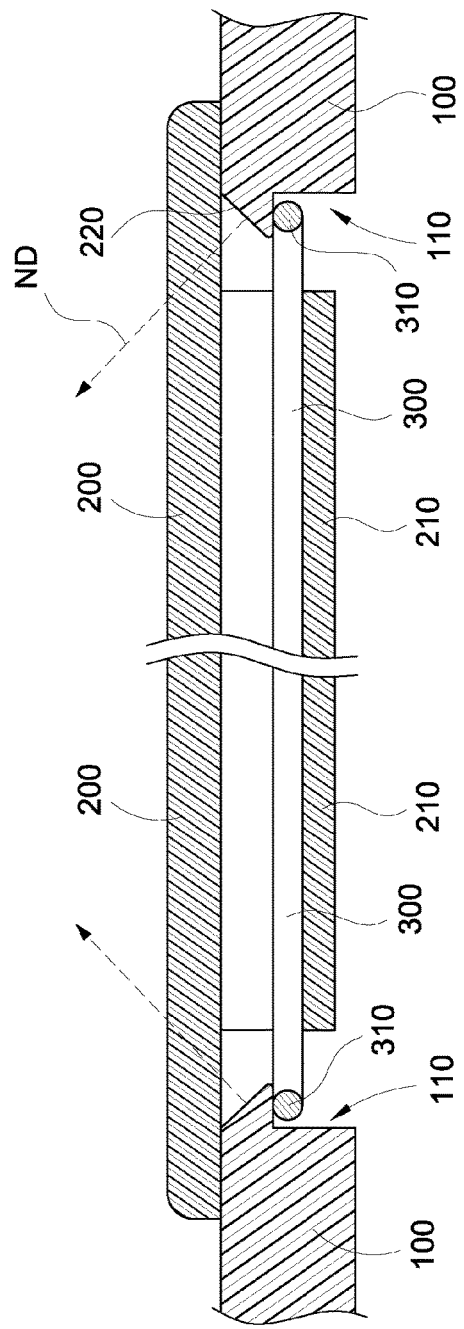
FIG. 4 is a cross-sectional view of door bolt structure of an electronic device according to the first embodiment of the present invention.

Referring to FIG. 4, the inner edge of the door frame 100 forms a ramp 220 corresponding in position to each hook portion 310, and normal directions ND of the ramps 220 (i.e., normal vectors of the ramps 220) meet each other.

During the process of shutting the door panel 200 relative to the door frame 100, each hook portion 310 is pressed against by a corresponding one of the ramps 220. When the door panel 200 provides a hermetic seal for the door frame 100, the hook portions 310 are inserted into the engagement recesses 110, respectively, and thus engaged with the inner edge of the door frame 100. When pulling portion 301 is pulled in a direction shown by the arrow, the resilient metallic wire 300 deforms from a first shape as illustrated in FIG. 2 to a second shape as illustrated in FIG. 3, causing portions 302 of the resilient metallic wire 300 between nodes 320 and hooks 310 to respectively rotate about nodes 320 pivotally and thus drive the hook portions 310 to separate from the door frame 100, thereby allowing the door panel 200 to move relative to the door frame 100.

Figure 5:
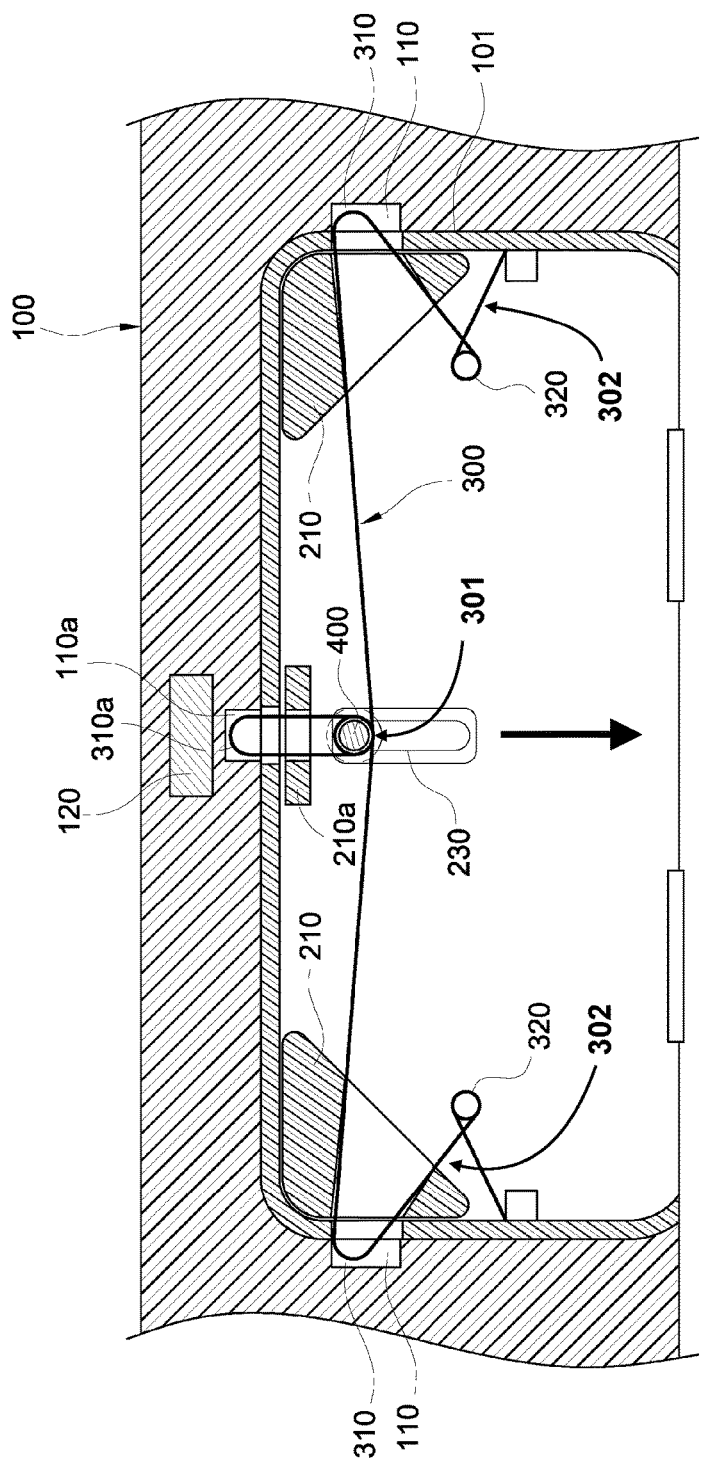
FIG. 5 is a schematic view of door bolt structure of an electronic device according to the second embodiment of the present invention.
Figure 6:
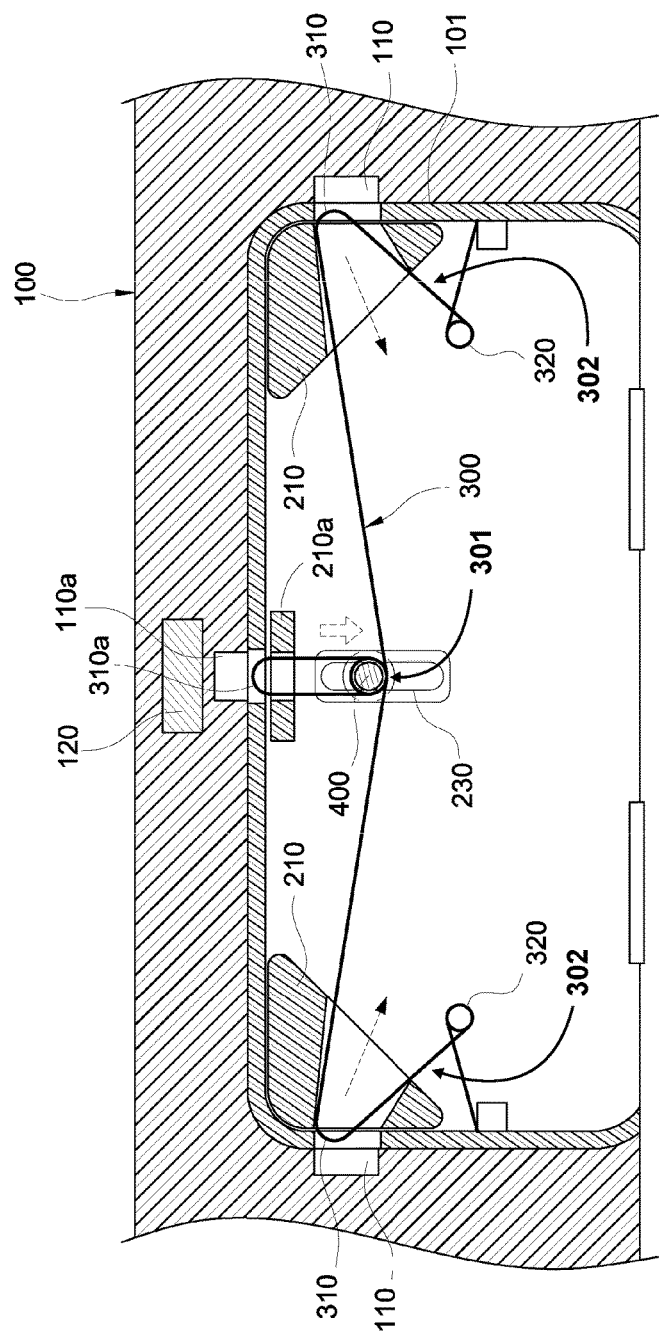
FIG. 6 is another schematic view of door bolt structure of an electronic device according to the second embodiment of the present invention.

Referring to FIG. 1, FIG. 5 and FIG. 6, the second embodiment of the present invention provides a door bolt structure of an electronic device 1, comprising a door frame 100, a door panel 200, and a resilient metallic wire 300.

Preferably, the door frame 100 is disposed on the casing 10 of the electronic device 1 and has a through hole 101. The through hole 101 is in communication with the inside and outside of the casing 10 of the electronic device 1. A plurality of engagement recesses 110, 110a is formed at the inner edge of the door frame 100. In this embodiment, preferably, two opposing engagement recesses 110 and a third engagement recesses 110a disposed between the two engagement recesses 110 are formed on the inner edge of the door frame 100.

The door panel 200 is movably disposed at the door frame 100. The door panel 200 provides a hermetic seal for the door frame 100. In this embodiment, one side of the door panel 200 is preferably pivotally connected to a portion of the inner rim of the through hole 101. Therefore, the door panel 200 can be pivotally rotated to thereby hide the through hole 101 and provide a hermetic seal for the door frame 100. A plurality of limiting structures 210, 210a is formed on a surface of the door panel 200. In this embodiment, two opposing limiting structures 210 and a third limiting structure 210a disposed between the two limiting structures 210 are preferably formed on the inner surface of the door panel 200. The engagement recesses 110, 110a correspond in position to and connect with the limiting structures 210, 210a, respectively.

The resilient metallic wire 300 bends and loops to form a plurality of the hook portions 310, 310a. In this embodiment, preferably, the resilient metallic wire 300 not only bends to form a pair of hook portions 310 but also bends and loops to form another hook portion 310a between the pair of hook portions 310, wherein the hook portions 310, 310a correspond in position to the engagement recesses 110, 110a and the limiting structures 210, 210a, respectively. The resilient metallic wire 300 is disposed on a surface of the door panel 200. In this embodiment, the resilient metallic wire 300 is preferably disposed on the inner surface of the door panel 200. The two ends of the resilient metallic wire 300 are connected to the inner surface of the door panel 200. The resilient metallic wire 300 is either fixedly connected to the door panel 200 or floatingly connected to the door panel 200, but the present invention is not limited thereto. At least a portion of the hook portions 310, 310a each is received in a corresponding one of the limiting structures 210, 210a. The hook portions 310, 310a of the resilient metallic wire 300 protrude from the edge of the door panel 200. The hook portion 310 slides along the limiting structures 210, 210a.

When the door panel 200 provides a hermetic seal for the door frame 100, the hook portions 310, 310a are inserted into the engagement recesses 110, respectively, and thus engaged with the inner edge of the door frame 100, as shown in FIG. 5. When pulling portion 301 is pulled in a direction shown by the arrow, the resilient metallic wire 300 deforms from a first shape as illustrated in FIG. 5 to a second shape as illustrated in FIG. 6, causing portions 302 of the resilient metallic wire 300 between nodes 320 and hooks 310 to respectively rotate about nodes 320 pivotally, while also moving hook portion 310a in the direction of the arrow, and thus driving the hook portions 310, 310a to separate from the door frame 100 as shown in FIG. 6, thereby allowing the door panel 200 to move relative to the door frame 100.

In this embodiment, a handle 400 is preferably disposed on the resilient metallic wire 300. The handle 400 is disposed between the two ends of the resilient metallic wire 300 and adapted to pull the resilient metallic wire 300. A guiding slot 230 is formed on the door panel 200. The handle 400 is penetratingly disposed in the guiding slot 230. The handle 400 slides along the guiding slot 230.

Figure 7:
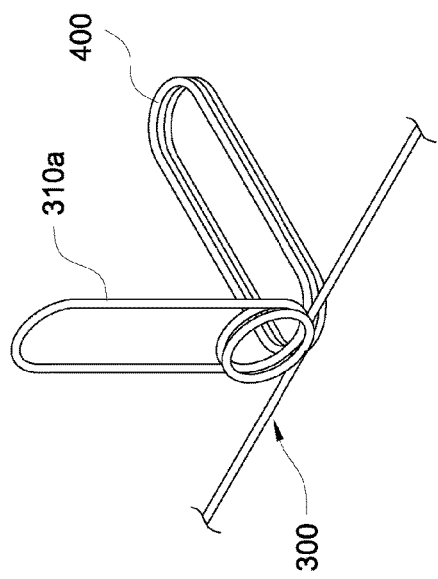
FIG. 7 is a schematic view of a handle in door bolt structure of an electronic device according to the second embodiment of the present invention.
Figure 8:
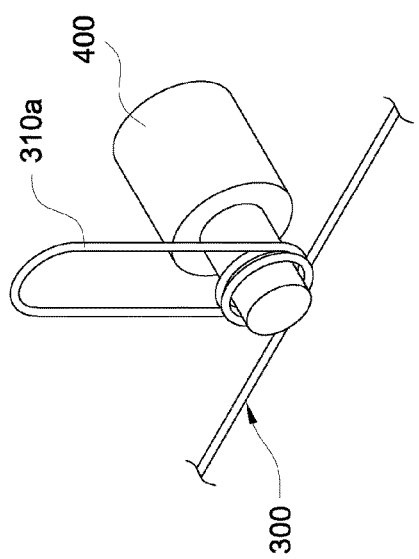
FIG. 8 is a schematic view of another aspect of the handle in door bolt structure of an electronic device according to the second embodiment of the present invention.

Referring to FIG. 7, the handle 400 is a rod attached to the resilient metallic wire 300, and the resilient metallic wire 300 winds around the handle 400 to fix the handle 400 to the resilient metallic wire 300. Referring to FIG. 8, the resilient metallic wire 300 bends and loops to form the handle 400.

Referring to FIG. 5 and FIG. 6, in this embodiment, preferably, a magnetic component 120 corresponding in position to at least one of the hook portions 310a is disposed on the door frame 100 as needed. The magnetic component 120 attracts a corresponding one of the hook portions 310a to therefore enhance the fixation of the hook portion 310a.

The door bolt structure of the present invention is characterized in that a single resilient metallic wire 300 substitutes for a conventional bolt and spring. Hence, the door bolt structure of the present invention is simple in structure and easy to assemble. Furthermore, the resilient metallic wire 300 incurs low costs and is easy to process.

The present invention is disclosed above by preferred embodiments which are not restrictive of the claims of the present invention. Equivalent changes made to the preferred embodiments of the present invention without departing from the spirit embodied in the present invention shall fall within the claims of the present invention.

What is claimed is:

1. A door bolt structure of an electronic device, comprising:
a door frame, wherein an inner edge of the door frame defines a through hole;
a door panel movably disposed at the door frame between an open position exposing the through hole and a shut position covering the through hole; and
a resilient metallic wire having two ends connected to the door panel, the resilient metallic wire bent to form a plurality of hook portions respectively protruding from an edge of the door panel;
wherein, in a first shape of the resilient metallic wire when the door panel is in the shut position, the hook portions are engaged with an inner edge of the door frame so as to prevent the door panel from moving relative to the door frame, and arranged such that when a pulling portion of the resilient metallic wire is pulled, the resilient metallic wire deforms into a second shape in which the hook portions are disengaged from the inner edge the door frame, thereby allowing the door panel to move relative to the door frame; wherein the door panel provides a hermetic seal for the door frame when the door panel is in the shut position.

2. The door bolt structure of an electronic device of claim 1, wherein the hook portions comprise loops in the resilient metallic wire.

3. The door bolt structure of an electronic device of claim 1, further comprising a handle, wherein the handle comprises a loop in the pulling portion of the resilient metallic wire.

4. The door bolt structure of an electronic device of claim 3, wherein a guiding slot is formed in the door panel, and the handle is penetratingly disposed in the guiding slot and slides along the guiding slot so as to allow the pulling portion of the resilient metallic wire to be pulled.

5. The door bolt structure of an electronic device of claim 1, further comprising a handle is disposed on the resilient metallic wire, wherein the handle comprises a rod attached to the pulling portion of the resilient metallic wire.

6. The door bolt structure of an electronic device of claim 3, wherein the handle is disposed between the two ends of the resilient metallic wire.

7. The door bolt structure of an electronic device of claim 1, further comprising a node, wherein the node comprises a loop in the resilient metallic wire arranged such that when the resilient metallic wire is in the first shape and pulled, a portion of the resilient metallic wire between the node and a respective one of the hooks rotates about the node pivotally.

8. The door bolt structure of an electronic device of claim 1, further comprising a plurality of ramps formed in the inner edge of the door frame, each ramp corresponding in position to a respective one of the hook portions arranged such that the hook portions are respectively pressed against by corresponding ones of the ramps during a process of shutting the door panel relative to the door frame.

9. The door bolt structure of an electronic device of claim 8, wherein normal directions of the ramps meet each other.

10. The door bolt structure of an electronic device of claim 1, wherein a plurality of limiting structures are formed on an inner surface of the door panel and respectively correspond in position to the hook portions, and at least a portion of each hook portion is received in the corresponding one of the limiting structures such that the hook portions respectively slide along the limiting structures.

11. The door bolt structure of an electronic device of claim 10, wherein a plurality of engagement recesses are formed at the inner edge of the door frame and respectively correspond in position and connect with the limiting structures, wherein the hook portions are inserted into and engaged with respective ones of the engagement recesses when the door panel is in the shut position and the resilient metallic wire is in the first shape.

12. The door bolt structure of an electronic device of claim 1, wherein a plurality of engagement recesses are formed at the inner edge of the door frame and respectively correspond in position to the hook portions, wherein the hook portions are inserted into and engaged with respective ones of the engagement recesse when the door panel is in the shut position and the resilient metallic wire is in the first shape.

13. The door bolt structure of an electronic device of claim 1, wherein a magnetic component corresponding in position to one of the hook portions is disposed on the door frame to attract a corresponding one of the hook portions.

* * * * *